United States Patent Office 2,936,265
Patented May 10, 1960

2,936,265

PROTEOLYTIC ENZYME AND METHODS FOR ITS PRODUCTION

Alvin R. Whitehill, Montvale, N.J., and Frank B. Ablondi, Pearl River, John H. Mowat, Orangeburg, and George Krupka, Nanuet, N.Y., assignors to American Cyanamid Company, New York, N.Y., a corporation of Maine No Drawing. Application October 25, 1954
Serial No. 464,642

8 Claims. (Cl. 195—62)

This invention relates to a proteolytic enzyme. More particularly, this invention is concerned with a proteolytic enzyme which is obtainable by propagation of fungi of the order Entomopthorales upon culture media, and methods for its recovery therefrom.

Proteolytic enzymes, otherwise referred to as proteases, promote the breakdown of proteins to proteoses, peptones, and amino acids. A number of such enzymes are known and are widely used commercially. As examples may be given trypsin, which occurs in pancreatic juice; pepsin which occurs in the gastric mucosa; rennin which is secreted in the fourth stomach of the young calf and papain which is obtainable from the juice of the exotic papaya tree.

The proteolytic enzymes named above and those of like character and origin have several obvious disadvantages. Trypsin has a short half-life (half-hour), is unstable, expensive to purify, and requires a neutral or faintly alkaline pH to exert optimal proteolytic activity. Pepsin is active only in the highly acid pH of 1.5 to 4.5. Rennin has a very limited commercial applicablity, being of interest only in that it has a rapid cloting action on milk, converting casein to para-casein. The papaya tree, from whose papain is obtained, is indigenous to tropical climates. The crude papain must, therefore, be imported from such far-off places as Ceylon and Africa. Although it can be grown in certain southern parts of the United States, labor costs for extracting and processing of the latex are prohibitively high.

Another notable disadvantage of papain as an industrially useful enzyme is its extreme chemical sensitivity. Since the papain molecule contains a sulfhydryl group, the enzyme is readily affected by oxidizing agents. Thus, upon exposure of the latex to the air, even for a short period of time, dithio groups are formed which reduce the potency of latex activity. Addition of a reducing agent such as cysteine is then required in order to elicit maximum proteolytic activity.

Since the proteolytic enzymes presently available are of unknown chemical structure and, therefore, incapable of commercial synthesis, naturally occurring sources such as animal stomachs, pancreas glands and plant juices have constituted the major sources of supply.

Of late years considerable effort has been directed toward the molds and fungi as a cheap, readily available source for proteolytic enzymes. Studies of limited nature have been made on fermentation methods, media formulations, and conditions suitable for optimal production and recovery of proteolytic enzymes. Thus, Maxwell (Australian Journal Scientific Research, Series B, 5:42–55, 1952) has shown that when a strain of the mold *Aspergillus oryzae* is grown on a modified Raulin's medium, a proteolytic enzyme is elaborated. Other attempts with this and other molds are well-exemplified in the literature.

The majority of previous attempts at culturing fungi under conditions suitable for industrial production of proteolytic enzymes have been only moderately successful. The methods disclosed in the prior art have been severely limited because of the prohibitively expensive media which were prescribed for the cultivation of the fungi, the long period of time required for fermentation, or the lack of suitable methods for separation and purification of the enzmye. In addition, the enzymes which are elaborated under the conditions described by these workers are very limited in their proteolytic activity, both as to scope and proteolytic power. Moreover, their range of stability with respect to pH is, not unlike trypsin and pepsin, extremely narrow.

We have now discovered a proteolytic enzyme which lends itself to a wide variety of uses. For example, in the leather industry to prepare leather from raw hides the epidermis and subcutaneous tissue must be removed by dehairing and bating the skins. This process of bating may be carried out by employing our proteolytic enzyme in conjunction with a deliming agent such as ammonium sulfate. The skins are first soaked in lime or dilute sodium hydroxide and then transferred to the solution containing the enzyme and the ammonium salt. This is generally carried out at 25° C. and pH 7.5. Thus, hair, elastin and keratose may be readily removed and the hides in this manner prepared for tanning.

Another field in which the enzyme of the present invention finds useful application is in the chillproofing of beer. It is known that a turbidity develops in beer when it is stored at temperatures just above freezing, subsequent to the malting and mashing processes of brewing. This turbidity is due to the precipitation of some residual proteins of the original grain amounting to about 0.35%. The addition of a small amount of our proteolytic enzyme prevents this turbidity by hydrolyzing the remaining protein.

The tenderizing of meat by partial modification of the proteins is still another useful application of our proteolytic enzyme. A small quantity of the powdered enzyme sprinkled on cuts prior to cooking or roasting produces a soft, readily digestable meat product. Other fields in which the enzyme of the present invention finds application are: in the dry cleaning industry, especially for the removal of egg albumen spots and the like; in the textile industry for desizing cloth; in the baking industry to produce bread of better texture and in the baby food industry as a protein digest supplement.

The new enzyme is a proteinaceous material of unknown chemical structure. A one ml. volume of the crude fermentation mash such as that produced by the method of this invention has a proteolytic activity of not less than 15,000 Azocoll units as determined by the procedure of Bidwell and Oakley (infra). A number of samples of the amorphous solid material, such as those produced by the procedures detailed below and assaying on an average not less than 1,000 Azocoll units per gamma of nitrogen manifest substantial proteolytic activity against casein at a pH range of from about 4.0 to about 11.0, an optimum being at pH 9.0. The enzyme has an iso electric point of about 10.2. A 1 percent solution of the substance in acetate buffer at pH 6.3 extrapolated to zero concentration and corrected to 20° C. in water has a sedimentation constant of $2.5 \times 10^{-13}$. A 0.4 percent solution of the enzyme, corrected to 20° C. in water has a diffusion constant of $8.2 \times 10^{-7}$. An aqueous solution having an ionic strength of 0.13 at pH 8.5 in barbital buffer has an electrophoretic mobility of $0.43 \times 10^{-5}$. A solution of the same ionic strength at pH 10.5 in glycine buffer has an electrophoretic mobility of $0.08 \times 10^{-5}$. Assuming a partial specific volume of 0.75, the sedimentation and diffusion constants correspond to a molecular weight of about 30,000. A 5 cc. volume of an aqueous solution of the enzyme at a concentration of about 0.5 percent, when injected intravenously at four-day intervals into a rabbit, produces a satisfactory antibody titre in the antiserum of the animal after about 4 or 5 injections. The specific antiserum so produced responds positively to a precipitin reaction against a 1/20 cc. volume of a 0.5 percent aqueous solution of the enzyme at a dilution of not less than 1:1,000. The enzyme is stable at a pH range from about 4.0 to about 11.0.

The enzyme of the present invention may be produced by fermentation of certain phycomycetous fungi of the order Entomophthorales. This order is described by Bessy (Morphology and Taxonomy of Fungi, pages 172–177, Blakiston Company, Philadelphia, 1950). The order comprises a single family, the Entomophthoraceae, which includes 6 genera: Entomophthora, Basidiobolus, Conidiobolus, Completoria, Massaspora, and Ancylistes.

Among the several genera of this family, the Entomophthora, Basidiobolus and Conidiobolus have been found to be of the greatest utility in the method of the present invention. Species of the genera which are operative in the method of the invention include for example, the Entomophthora species *apiculata, coronata, sphaerosperma*; the Basidiobolus species *ranaraum* and the Conidiobolus species *brefeldianus*.

Although the species of the family of fungi generally referred to as Entomophthoraceae are broadly operative in the method of the present invention as producers of proteolytic enzyme, for reasons of productivity species of the genera Entomophthora and Conidiobolus are preferred.

In a broad embodiment of the process which we prefer to use for producing the enzyme of the present invention, a fungus of the order Entomophthorales is grown under submerged fermentation conditions in a suitable nutrient medium. It is preferred that such medium contain an assimilable source of carbon, nitrogen and trace amounts of inorganic salts. Fermentation conditions such as time, temperature, and hydrogen ion concentration may be varied broadly without departing from the scope of the invention. At the conclusion of the fermentation period, the enzyme may be recovered from the fermentation mash by a number of methods such as for example, adsorption upon diatomaceous earths or magnesium silicate, and elution therefrom with aqueous media at a substantially alkaline pH range.

A wide variety of substances may be used as sources of carbon in the nutrient medium. These may be either soluble or insoluble in water, it being desirable only that the compounds used be readily assimilable by the fungus. As examples may be given the pentoses such as arabinose, ribose and xylose; the monosaccharides such as mannose, levulose and galactose; the disaccharides such as trehalose, maltose, lactose, cellibiose and sucrose; the polysaccharides such as starch; the higher alcohols such as glycerol, mannitol, sorbitol and inositol; and miscellaneous sources such as ethyl alcohol and calcium carbonate.

Our preferred medium is one which contains a quantity of about 5 percent by weight of a carbon source. We have found that the presence of sugar is essential to the growth of the mold if a high yield of mycelium is desired. Although it is possible to grow the fungus successfully in a nutrient medium having no added carbohydrate source of carbon, the yields of enzymes produced under such conditions are so low as to be of little commercial significance.

Nitrogen in assimilable form may be provided by animal or vegetable proteins, soybean meal, casein, peptones, polypeptides, or amino acids. As specific examples may be given animal stick liquor, sodium nitrate, asparagine, urea, histidine and guanine. A 1 percent quantity of casein hydrolyzate, either alone or together with a sugar such as dextrose, yields appreciable quantities of the enzyme. If desired, various quantities of inorganic salts may be added either to a combination of casein hydrolyzate and sugar, or to a sugar alone. We have found that when animal stick liquor is employed as a source of nitrogen, best results are obtained when a sugar is also present in the medium, although good yields are also produced when no carbohydrate carbon source is added.

The optimum pH conditions for the growth of the proteolytic enzyme of this invention may be varied from about 5.0 to about 9.0. For best results, however, we have found that a range from about 6.0 to about 8.0 is preferable. Above this limit, the enzyme is so active that it destroys itself, whereas a pH of less than 6.0 is unfavorable to the development of the micro-organisms. Adjustment of the pH may be accomplished with any suitable base such as sodium hydroxide, phosphate buffer, sodium citrate, sodium acetate or any other suitable material which would bring the pH within the desired range.

The temperature of the nutrient medium during fermentation of the fungus may be maintained between about 20° C. and 30° C., a range of about 25° C. to 30° C. being preferred. When the temperature is permitted to rise above 30° C., little or no enzyme is produced and a yeast-like growth is obtained. When the temperature is reduced substantially below 25° C., the growth of the fungus is too slow.

The time required for the production of a maximum amount of proteolytic enzyme may be widely varied, depending upon the nature of the particular ingredients employed in the nutrient medium. However, a period from about 24 to about 90 hours is usually considered adequate for the production of optimal amounts of the enzyme.

In the preferred embodiment of the present invention a 24-hour inoculum of the fungus is added to 50 cc. of medium in a quantity sufficient to make a 0.5% to 1.0% concentration. The flask is incubated at 26° C. to 29° C. in a shake culture for a period of about 48 to 96 hours. During fermentation sterile air is forced through the medium, the aeration serving simultaneously as a means of agitation. The degree of proteolytic enzyme activity elaborated is then computed by a modified Azocoll assay, in a manner described more fully below. Maximum production is usually evidenced in a period of about 48 to 72 hours.

The mold which is to be used as the inoculum may be grown on a suitable medium such as an agar slant. To obtain a 24-hour inoculum, a loopful of vegetative mycelium may be taken from an agar slant, deposited into a volume of about 50 cc. of nutrient medium and allowed to incubate for 24 hours at a temperature from about 20° C. to 30° C.

Anti-foaming agents may be added aseptically to the fermentation medium as required. We have found 1 percent octadecanol in lard oil to be preferable for this purpose although a wide variety of others may be equally advantageous. As examples of these may be given soybean oil, castor oil, olein, sulfonated oils, lard oil, brominated castor oil. Amounts ranging from 0.1 percent to 1 percent may be added.

Best results are obtained when a liquid medium containing inorganic salts is employed. The process of the present invention is, therefore, preferably conducted with a liquid medium containing trace amounts of mineral constituents, either added or naturally present. Nitrates, phosphates, sulfates and chlorides may be provided as salts of the heavy metals, the alkaline earth metals or the alkali metals such as for example calcium, cobalt, sodium, potassium, magnesium or manganese. By trace amounts is meant quantities varying between 0.001 percent and 0.0001 percent.

At the conclusion of the fermentation process, and when it has been determined by the Azocoll assay that the maximum yield of protease has been obtained, the enzyme is subjected to a separation and purification process. In view of its labile character the steps employed for purification must necessarily be selective and of such nature as would insure minimum destruction and maximum separation of the enzyme from the remainder of the constituents of the fermentation broth.

Although a variety of methods may be used for the separaiton of the enzyme from the fermentation broth, we have discovered a particularly useful method and it is intended that this method be embraced within the scope of the present invention. In accordance with our process, the proteolytic activity is adsorbed upon a suitable adsorbent material at a mash pH varying in range from about 6.5 to about 8.5. The adsorption may take place either before or after separation of the cells from the mash. The enzyme-containing adsorbent material is separated from the fermentation beer by any suitable means such as filtration or centrifugation, and the filtrate (or supernatant) is discarded. The proteolytic activity is recovered by slurrying the adsorbent with an aqueous alkali such as ammonium, sodium or potassium hydroxide at a range of about 9.0 to 11.5, preferably about 10.5. The slurry is filtered and the cake washed with aqueous alkali to insure maximum recovery. The wash is combined with the eluate and, if desired, subjected to further separation and purification procedures.

The adsorbents which may be advantageously employed in the present invention, and which we prefer to use, are those belonging to the class known as purified diatomaceous earths. These are available under various tradenames such as Attasorb or Superfiltrol. We have also found that the magnesium silicates such as the commercially available products known as "Magnesol" or "Florisil" are useful for adsorbing the proteolytic activity. Other suitable adsorbents are fuller's earth, activated charcoal, lampblack, titanium oxide, synthetic cracking catalyst and similar types of compounds. The artificial zeolites, as for example the product available under the trademark "Permutit," may also be suitably employed.

When a magnesium silicate type of adsorbent is used, it is preferred for best results to subject the adsorbent to preliminary treatment by washing it with dilute aqueous mineral acid such as hydrochloric or sulfuric, rinsing off the residual acid with water, and drying before use.

To effect maximum elution, the adsorption cake is suspended in water, adjusted to a high pH, stirred and then filtered or centrifuged. The elution is usually carried out at about pH 10.5 but the range may vary from about 9.0 to 11.5. In the case of a weak adsorbent, such as for example a synthetic cracking catalyst, elution can be achieved at a pH as low as 7.4.

The presence of a small quantity of sodium chloride is generally considered to be favorable for maximum elution. Thus, when an eluant of pH 10.5 is used, it is preferred that a concentration of about 2% sodium chloride be present therein.

Immediately after filtration, the pH of the eluate (containing the proteolytic activity) is lowered to a range from about 6.0 to about 8.0 since the stability of the enzyme is optimal at this hydrogen ion concentration. This may be done conveniently by adding Dry Ice or gaseous carbon dioxide to the solution until the desired pH is obtained.

The crude enzyme obtained by the foregoing method is substantially free of impurities and may be used as such in many industrial processes such as dry cleaning, hide bating, or desizing cloth. In other fields, however, such as the pharmaceutical industry, bread-baking or baby food preparation, it may be desirable to obtain a product of maximum purity. Thus, one modification of the present invention is to subject the partially purified proteolitically active substance to further treatment. In accordance with this feature of our process, the enzyme is precipitated from its aqueous solution by the addition of a volume of acetone. Although 2 to 4 volumes of acetone are considered sufficient, it is preferred that a volume of about 2½ to 3 be added. The resulting precipitate is collected by centrifugation, or by filtration with a suitable filter-aid such as diatomaceous earth. If the latter procedure is employed, it is necessary to separate the enzyme from the filter-aid by washing with a suitable aqueous solvent such as 1% sodium chloride.

The acetone-precipitated proteolytic activity may then be readily put into a stable, commercially useful form by a number of simple procedures, among which are dissolution in a volume of 1% aqueous sodium chloride followed by sterilization; lyophilization to give a stable solid, or drying by suspension in anhydrous acetone followed by filtration.

It has been found desirable to employ a protective agent in drying the proteolytic activity. Such an adjuvant is desirable whether the process used is lyophilization or solvent-drying such as with acetone or a similar solvent. The protective adjuvants which we have found to be satisfactory for this purpose are sorbitol, corn syrup, lactose, dextrose, gelatin and gum acacia, although others of similar nature will occur readily to those skilled in the art. The adjuvant may be conveniently added to the enzyme solution just prior to the lyophilization or acetone-treatment step.

Although the exact nature of the action of the protective adjuvant is not known, it is possible that it functions as a humecant. It may be, however, that the adjuvant simply forms a coating around minute particles of drying enzyme and serves as a protection from the atmosphere.

When it is elected to perform the drying with acetone, the use of the adjuvant alone tends to result in the formation of a gummy precipitate which cannot be resolved into a dry form. It is advantageous in such cases to employ a bulking agent together with the adjuvant before addition of the acetone. This procedure insures the formation of a solid, tractable precipitate which may be readily dried. Bulking agents which have been found particularly satisfactory are starch, wood pulp, magnesium silicate, diatomaceous earth, and compounds of similar nature. The protective adjuvant and the bulking agents are added to an aqueous solution containing the proteolytic activity and the mixture is stirred. Two to five volumes of acetone are then added and the active precipitate is collected on a filter and washed with cold acetone. The precipitate is suspended in anhydrous acetone, filtered, dried in the air, and pulverized. The resulting product may be used as such over a wide pH range, perhaps as great as 4.0 to about 11.0, the optimum and preferred range being from about 8.0 to about 9.0.

If so desired, drying of the proteolytic enzyme may be accomplished by employing solvents other than acetone which are miscible with water and in which the enzyme is insoluble. Examples of such solvents are dioxane and the lower alkyl alcohols—methyl, ethyl, propyl, isopropyl, butyl and isobutyl.

If the proteolytic enzyme is intended for a non-medicinal use, as for example in leather-tanning, it is not necessary to subject the fermentation beer to expensive and tedious separation procedures. Thus, as another modification of our invention, we may readily precipitate the proteolytic activity from the beer with tannic acid, or other suitable protein precipitants such as phosphotungstic acid, zinc chloride, ferric chloride, etc. This procedure enables a very simple preparation of a usable product from fermentation mashes or beers. The protein precipitant is simply added directly to the mash or cell-free beer and the precipitate is separated from the mother-liquor, mixed with a bulking agent such as sawdust, and dried. The process may be employed either with or without a protective adjuvant such as corn syrup, etc.

It will be readily apparent, of course, that different combinations of the above elements may be employed, depending on the purity and physical aggregation of the product desired. For example, a highly pure, stable, dry powder may be obtained by adsorption and elution followed by acetone precipitation and resolution in 1% saline followed in turn by the addition of an adjuvant and lyophilization. Alternatively, a crude product may be obtained simply by adsorbing the activity onto an adsorbent such as activated charcoal and employing the adsorbed cake as such on the substrate. The variations and permutations of these various elements are readily apparent to those skilled in the art.

When an acid precipitation purification procedure is employed, such as that employing tannic acid, the resulting complex may be useful per se. However, it may be advantageous to separate the new enzyme from the tannic acid in order to get a more pure product. Accordingly, we prefer to slurry the tannic acid precipitate in a small amount of water, and then add two volumes of an organic solvent such as acetone or an alcohol, as for example, methyl, ethyl, propyl or butyl. The tannic acid-protein complex decomposes and the tannic acid dissolves in the solvent but the enzyme activity remains insoluble. The two fractions may then be readily separated by centrifugation or filtration and the activity in the residual solids may be taken up in saline solution.

As mentioned above, the presence and degree of proteolytic activity can be determined by the Azocoll assay, the procedure used in the present invention being a modification of the assay described by Bidwell (Biochemical Journal, 46, pages 589–598 (1950)) and by Oakley et al. (Journal of Pathology and Bacteriology, 58, pages 229–235 (April 1946)). This test is based on the power of the proteolytic enzyme to hydrolyze hide powder, dyed with an azo dye. Upon contact with the enzyme, the protein molecule is destroyed and the dye is released into the fluid medium. The greater the hydrolyzing power of the enzyme, the greater is the intensity of the color produced by liberated dye as compared to a blank. We have found that the enzyme of this invention shows a characteristic Azocoll assay of at least 15,000 units per ml. of fermentation mash. Under suitable conditions of time, temperature, pH, aeration, nitrogen and carbon sources, we have obtained yields as high as 75,000 units per ml.

In accordance with the modified Azocoll assay of the present invention, a diazotized hide powder is prepared as described by Oakley et al. (supra). A pH 7.4 to 7.5 buffer is prepared, comprising 85 parts of $Na_2HPO_4 \cdot 12H_2O$, 8 parts of $KH_2PO_4$, and 40 parts of NaCl made up to 9,000 parts with distilled water. A 10 ml pipette, the Azocoll and buffer are brought to 37° C. and the enzyme sample is diluted with buffer to a dilution which, after digestion of Azocoll, will give a reading of 700 or less on a Klett-Summerson photoelectric colorimeter using a No. 54 green filter. 0.1 ml. of diluted enzyme sample and 9.9 ml. of buffer are introduced into an Azocoll bottle containing 50 mg. of Azocoll powder and the bottle is incubated on the shaker at 37° C. for 15 minutes. The mixture is filtered, and the reading of the filtrate is determined with the Klett instrument, which has been previously "zero set" with buffer. An "Azocoll blank" reading is determined in the same manner using a 10 ml. sample of buffer instead of 0.1 ml of diluted enzyme solution and 9.9 ml. of buffer. The Azocoll blank reading is substracted from the test sample reading, and the resulting value is multiplied by 10 times the dilution factor to give a value indicating the Azocoll units per ml. in the original sample. To illustrate, assume an enzyme sample diluted 1 to 8 gives a reading of 500, and the Azocoll blank reading is 115. The difference, 385, is multiplied by 10×8, giving 30,800 Azocoll units per ml.

The following examples are given as illustrative of our process, but are not intended to be limitative upon the scope thereof. All parts are by weight unless otherwise specified.

Example 1

A medium comprising 1% casein hydrolysate, 1% glucose, 0.3% $NaNO_3$, 0.1% $K_2HPO_4$, 0.05% KCl, 0.05% $MgSO_4 \cdot 7H_2O$ and 0.001% of $FeSO_4 \cdot 7H_2O$ was made up to 12 liters with tap water and sterilized. An inoculum of *Entomophthora apiculata* from a 30-hour old bottle culture was added to the nutrient medium and incubated at a temperature of 27° C. to 28° C. with agitation. At the end of 96 hours the nutrient medium assayed 50,000 Azocoll units of proteolytic enzyme per ml.

Example 2

A medium comprising 1% casein hydrolysate, 1% glucose, 0.3%, $NaNO_3$, 0.1% $K_2HPO_4$, 0.05% KCl, 0.05 $MgSO_4 \cdot 7H_2O$ and 0.001% of $FeSO_4 \cdot 7H_2O$ was made up to 100 liters with tap water and sterilized at 115° C. to 120° C. for about 30 minutes. An inoculum of 30-hour old bottle cultures of *Entomophthora apiculata* was added to the sterile nutrient medium and the fermentation temperature controlled at 26° C. to 28° C. Sterile air was forced through the mixture and agitation was provided by mechanical means. At the end of 32 hours following inoculation, the fermentation medium assayed 21,500 Azocoll units of proteolytic enzyme per ml.

Example 3

A medium comprising 1% casein hydrolysate, 1% glucose, 0.3% $NaNO_3$, 0.1% $K_2HPO_4$, 0.05% KCl, 0.05% $MgSO_4 \cdot 7H_2O$ and 0.001% of $FeSO_4 \cdot 7H_2O$ was made up to 1 liter with tap water. Lots of about 50 ml. were placed in suitable fermentation flasks and these were sterilized at 115° C. to 120° C. for 30 minutes. Each flask was inoculated with a volume of *Conidiobolus brefeldianus* inoculum from a 48-hour old culture. The flasks were incubated on a reciprocating shaker at a temperature of 28° C. 24 hours after inoculation, the medium assayed 49,200 Azocoll units of proteolytic enzyme per ml.

Example 4

A medium comprising 1% casein hydrolysate, 1% glucose, 0.3% $NaNO_3$, 0.1% $K_2HPO_4$, 0.05% KCl, 0.05% $MgSO_4 \cdot 7H_2O$ and 0.001% of $FeSO_4 \cdot 7H_2O$ was made up to a 12 liter volume and sterilized at 115° C. to 120° C for 30 to 40 minutes in a suitable container. An inoculum of *Conidiobolus brefeldianus* was added to the nutrient medium and incubated at a temperature of 27° C. to 28° C. Sterile air was forced through the fermentation mixture. Agitation was provided by mechanical means. 39 hours following incubation the medium assayed 57,000 Azocoll units of proteolytic enzyme per ml.

Example 5

A medium comprising 1% casein hydrolysate, 1% glucose, 0.3% $NaNO_3$, 0.1% $K_2HPO_4$, 0.05% KCl, 0.05% $MgSO_4 \cdot 7H_2O$ and 0.001% of $FeSO_4 \cdot 7H_2O$ was made up to 200 liters with tap water and sterilized at about 120° C. for 30 to 40 minutes. An inoculum of a 30-hour old culture of *Conidiobolus brefeldianus* was added to the sterile medium and the temperature was controlled at 26° C. to 27° C. Sterile air was forced through the mixture and agitation was provided by mechanical means. 40 hours after the agitation the medium assayed 43,500 Azocoll units of proteolytic enzyme per ml.

Example 6

A medium comprising 2 parts of animal stick liquor and 3 parts of glucose was made up to 100 parts with tap water and sterilized. Lots containing 50 parts of the medium were placed in suitable containers and inoculated with a 24-hour culture of *Conidiobolus brefeldianus*. The medium was incubated on a mechanical shaker for 3 days at 28° C. At the end of this time the medium assayed 78,000 Azocoll units of proteolytic activity per ml.

Example 7

A medium comprising 2 parts of animal stick liquor and 3 parts of glucose was made up to 100 parts with tap water and sterilized. A 400 part volume was placed in a suitable container and inoculated with a 24-hour old culture of *Conidiobolus brefeldianus*. Sterile air was forced through the fermenting mixture and agitation was provided by mechanical means. 70 hours following inoculation the medium assayed 79,000 Azocoll units of proteolytic activity per ml.

Example 8

An inoculum of *Conidiobolus villosus* may be added to a sterilized medium comprising 1% casein hydrolysate, 1% dextrose, 0.3% $NaNO_3$, 0.1% $K_2HPO_4$, 0.05% KCl, 0.05% $MgSO_4 \cdot 7H_2O$ and 0.001% $FeSO_4 \cdot 7H_2O$ made up to 100% with tap water and the mixture incubated at a temperature of 26° C. to 28° C. Sterile air may be forced through the mixture, and agitation may be provided by mechanical means. Good yields of proteolytic enzyme are obtained at the end of about 3 days.

Example 9

An inoculum of *Basidiobolus ranarum* may be added to a sterilized medium comprising 1% casein hydrolysate, 1% dextrose, 0.3% $NaNO_3$, 0.1% $K_2HPO_4$, 0.05% KCl, 0.05% $MgSO_4 \cdot 7H_2O$ and 0.001% $FeSO_4 \cdot 7H_2O$ was made up to 100% with tap water and the mixture sterilized at a temperature of 26° C. to 28° C. Sterile air may be forced through the mixture and agitation may be provided by mechanical means. Good yields of proteolytic enzyme are obtained at the end of about 48 hours.

Example 10

An inoculum of *Entomophthora coronata* may be added to a sterilized medium comprising 1% casein hydrolysate, 1% dextrose, 0.3% $NaNO_3$, 0.1% $K_2HPO_4$, 0.05% KCl, 0.05% $MgSO_4 \cdot 7H_2O$ and 0.001% $FeSO_4 \cdot 7H_2O$ was made up to 100% with tap water and the mixture was sterilized at a temperature of 26° C. to 28° C. Sterile air may be forced through the mixture and agitation may be provided by mechanical means. Good yields of proteolytic enzyme are obtained at the end of about 36 hours.

Example 11

To a sterilized medium comprising 2 parts of animal stick liquor and 3 parts of glucose made up to 100 parts with tap water, may be added an inoculum of *Conidiobolus villosus*. A good yield of proteolytic enzyme may be obtained after incubation of the medium on a mechanical shaker for 3 days at 28° C.

Example 12

To a sterilized medium comprising 2 parts of animal stick liquor and 3 parts of glucose made up to 100 parts with tap water may be added an inoculum of *Basidiobolus ranarum*. A good yield of proteolytic enzyme may be obtained after incubation of the medium on a mechanical shaker for about 48 hours at 28° C.

Example 13

To a sterilized medium comprising 2 parts of animal stick liquor and 3 parts of glucose made up to 100 parts with tap water may be added an inoculum of *Entomophthora sphaerosperma*. A good yield of proteolytic enzyme may be obtained after incubation of the medium on a mechanical shaker for about 36 hours at 28° C.

Example 14

To a sterilized medium comprising 2 parts of animal stick liquor and 3 parts of glucose made up to 100 parts with tap water may be added an inoculum of *Entomophthora coronata*. A good yield of proteolytic enzyme may be obtained after incubation of the medium on a mechanical shaker for about 36 hours at 28° C.

Example 15

15 parts by weight of sulfuric acid washed magnesium silicate was added to 1,000 parts by volume of cell-free beer (prepared in accordance with the process of Example 4) and the mixture was stirred. The suspension was filtered and the filter cake was washed with 100 parts by volume of distilled water. The filter cake was slurried in a cold solution of 100 parts by volume of concentrated aqueous ammonia and 100 parts by volume of water and the mixture was filtered. The cake was washed with a small amount of cold ammonia solution and the filtrate and wash were combined. The cell-free beer, assayed before adsorption and elution, contained about 25 million Azocoll units of proteolytic activity per thousand parts by volume of fluid. The eluate, after adsorption and elution, showed 18 million Azocoll units of proteolytic activity per thousand parts by volume of fluid.

Example 16

A volume of fermented mash obtained in accordance with the process of Example 4 was filtered with the aid of 2,000 parts by weight of diatomaceous earth, yielding 140,000 parts by volume of cell-free beer. A 1% quantity of acid washed magnesium silicate was added to the beer and the mixture was stirred. After the solid had settled, supernatant was siphoned off and the filter cake was washed with water. The filter cake was slurried in 5,000 to 6,000 parts by volume of cold water and aqueous sodium hydroxide solution was added to the stirred slurry until the pH was reached and maintained at about 10.5. The alkaline slurry was stirred and the mixture was filtered. The pH of the eluate was adjusted to about 8.0 with carbon dioxide. 140,000 parts by volume of the cell-free beer, assayed before purification, showed about 1.9 billion Azocoll units of proteolytic activity. The 6,000 parts by volume of eluate showed 1.7 billion Azocoll units of proteolytic activity.

Example 17

About 18,000 parts by volume of cold acetone was added to the eluate of the previous example and the mixture was allowed to stand for several hours at about 4° C. The precipitate was collected by centrifugation and dissolved in about 2,500 parts by volume of 1% aqueous sodium chloride solution. 6,000 parts by volume of the eluate assayed 1.7 billion Azocoll units of proteolytic activity. 2,500 parts by volume of the saline solution assayed at least 1.7 billion units of proteolytic activity.

Example 18

A quantity of 3,000 parts by weight of sulfuric acid washed magnesium silicate was added to 200,000 parts by volume of cell-free beer (obtained from the fermented mash produced in accordance with Example 4). The mixture was stirred and filtered. The filter cake was slurried in about 4,500 parts by volume of 2% aqueous sodium chloride and aqueous sodium hydroxide solution was added to the stirred slurry to bring the pH to 10.5. The mixture was stirred and the filter cake was re-eluted twice using the same procedure. The three eluates were combined to give a total eluate of about 14,000 parts by volume. 200,000 parts by volume of the cell-free beer assayed 5.76 billion Azocoll units of proteolytic activity prior to purification. The eluate, 13,900 parts by volume, assayed 4 billion Azocoll units of proteolytic activity.

Example 19

About 40,000 parts by volume of cold acetone was added to the 13,900 parts by volume quantity of eluate of the previous example. The mixture was allowed to stand for several hours and the precipitate was collected by centrifugation. The precipitate was dissolved in 1,400 parts by volume of cold 1% aqueous sodium chloride solution and the solution was clarified by treatment with diatomaceous earth. The solution, a 1,400 parts by volume quantity, assayed 3.75 billion Azocoll units of proteolytic activity.

Example 20

A quantity of about 70 parts by weight of dry crystalline sorbitol was dissolved in the 1,400 parts by volume saline solution of the previous example. Aliquots were shell-frozen and lyophilized. A 1,400 parts by volume quantity of sorbitol-saline solution assayed 3.73 billion Azocoll units of proteolytic activity. The lyophilate assayed 3.94 billion units of proteolytic activity.

Example 21

About 2,600 parts by weight of acid-washed magnesium silicate was added to 175,000 parts by volume of cell-free beer prepared in accordance with the process of Example 4. The mixture was stirred and filtered. The filter cake was eluted twice with 2% aqueous sodium chloride solution and adjusted to pH 10.5 with sodium hydroxide. A 175,000 parts by volume quantity of the cell-free beer assayed 3.06 billion Azocoll units of proteolytic activity. The eluate, a 10,200 parts by volume quantity, assayed 2.09 billion Azocoll units of proteolytic activity.

Example 22

About 500 parts by volume of 10% aqueous calcium chloride solution was added to the pH 10 filtrate of the previous example and the mixture was filtered. The cake was washed with water and the wash was added to the filtrate. The combined filtrate-wash was adjusted to pH 7 with carbon dioxide and 29,000 parts by volume of cold acetone was added. The resulting precipitate was collected by centrifugation and dissolved in cold 1% aqueous sodium chloride solution. An 11,750 parts by volume quantity of the calcium chloride filtrate had 2.23 billion units of proteolytic activity. A 1,300 parts by volume quantity of the saline solution assayed 1.5 billion Azocoll units of proteolytic activity.

Example 23

About 182 parts by volume of 70% aqueous sorbitol and 520 parts by weight of potato starch were added to the saline solution of the previous example and the mixture was stirred. While stirring, 7,800 parts by volume of cold (about $-30°$ C.) acetone was added and the stirring was continued. The solids were allowed to settle and the supernatant liquid was decanted. The solids were filtered, dried with cold acetone and then room temperature acetone, and then air dried. The dry product assayed 1.3 billion units of proteolytic activity.

Example 24

About 1,000 parts by weight of damp, acid washed magnesium silicate was added to 180,000 parts by volume of cell-free beer prepared in accordance with the process of Example 4 and the mixture was stirred. Another 200 parts by weight of damp acid washed magnesium silicate was added. The stirring was continued for an additional hour. The solids were separated by means of a supercentrifuge, slurried with 2,000 parts by volume distilled water and filtered. The washed filter cake was slurried in 840 parts by volume of 70% aqueous sorbitol and the slurry was shell frozen and lyophilized. The dry product is useful in this form and can simply be added to the substrate. This product, however, cannot be assayed by the Azocoll assay. The value below was calculated by comparison with sodium caseinate assay. A 100,000 parts by volume quantity of cell-free beer assayed 3.1 billion units of proteolytic activity. The dry product assayed 2.7 billion units of proteolytic activity.

Example 25

A 5,000 parts by volume quantity of an aqueous solution containing 10% tannic acid and 5% sodium bisulfite was added to about 465,000 parts by volume of cell-free beer prepared in accordance with the process of Example 4. The mixture was stirred and then allowed to settle. The supernatant liquor was decanted and the solids were separated by means of the supercentrifuge. The cake was stirred with 5,000 parts by volume of water to which about 1,000 parts by weight of corn syrup had been added. The mixture was stirred, 6,000 parts by weight of sawdust was added and this mixture was thoroughly stirred and dried. The cell-free beer (a 465,000 parts by volume quantity) assayed 11.4 billion Azocoll units of proteolytic activity. The dry product, 7,200 parts by weight of ground blended powder, assayed 6.2 billion Azocoll units of proteolytic activity.

Example 26

About 10 parts by volume of an aqueous solution containing 10% tannic acid and 5% sodium bisulfite was added to 1,000 parts by volume of cell-free beer prepared in accordance with the process of Example 4. The mixture was stirred, after which time the solid material was separated by centrifugation. This solid material was then stirred with 30 parts by volume of distilled water and 6 parts by volume of cold acetone was added. This slurry was stirred and then centrifuged. The solids were reslurried with 30 parts by volume of water and 60 parts by volume of acetone and again centrifuged. The two filtrates were combined and the resulting solution was found to give a strong ferric chloride test. The residual solids were stirred throughly in 100 parts by volume of 2% aqueous sodium chloride solution and centrifuged. The cell-free beer assayed 18 million Azocoll units of proteolytic activity. The aqueous saline filtrate assayed 15 million units of proteolytic activity.

We claim:

1. A dry solid material free from associated tissue and mycelia and comprising a proteolytic enzyme elaborated by a fungus selected from the group consisting of the species *Entomophthora apiculata*, *Entomophthora coronata*, *Basidiobolus ranarum*, *Conidiobolus brefeldianus* and *Conidiobolus villosus*, said proteolytic enzyme having a molecular weight of about 30,000, an isoelectric point of 10.2, exerting optimal proteolytic activity at a pH of about 9.0 when measured against casein; having a sedimentation constant of $2.5 \times 10^{-13}$, a diffusion constant of $8.2 \times 10^{-7}$, an aqueous solution of ionic strength 0.13 adjusted to pH 8.5 in barbital buffer exhibiting an electrophoretic mobility of $0.43 \times 10^{-5}$, a solution of similar ionic strength adjusted to pH 10.5 in glycine buffer exhibiting an electrophoretic mobility of $0.08 \times 10^{-5}$, said enzyme being stable over a pH range from about 4.0 to about 11.0 and giving a positive precipitin reaction against a 1:1,000 dilution of specific rabbit antiserum.

2. A process for the production of a proteolytic enzyme elaborated by a fungus selected from the group consisting of the species *Entomophthora apiculata*, *Entomophthora coronata*, *Basidiobolus ranarum*, *Conidiobolus brefeldianus* and *Conidiobolus villosus*, which comprises the steps of growing under aerobic conditions a fungus of a species selected from the group consisting of the species *Entomophthora apiculata*, *Entomophthora coronata*, *Basidiobolus ranarum*, *Conidiobolus brefeldianus* and *Conidiobolus villosus*, in an aqueous medium having a pH between 5.0 and 9.0 and containing an assimilable carbohydrate, a source of assimilable nitrogen and traces of inorganic salts at a temperature within the range of $20°$ C. to $30°$ C. for a period of time of about 48 to 96 hours and recovering the so produced enzyme from the fermentation medium.

3. A method for the production of a proteolytic enzyme elaborated by a fungus selected from the group consisting of the species *Entomophthora apiculata*, *Entomophthora coronata*, *Basidiobolus ranarum*, *Conidiobolus brefeldianus* and *Conidiobolus villosus*, which comprises the steps of introducing a culture of a fungus selected from the group consisting of the species *Entomophthora apiculata*, *Entomophthora coronata*, *Basidiobolus ranarum*, *Conidiobolus brefeldianus* and *Conidio-*

*bolus villosus*, into an aqueous nutrient liquor having a pH between about 5.0 and 9.0 and containing fermentable carbonaceous and nitrogenous substances and traces of inorganic acid salts, and fermenting said liquor aerobically until an assay of at least 15,000 Azocoll units per ml. has been obtained and thereafter recovering the so produced enzyme from the fermentation liquor.

4. A process for the production of a proteolytic enzyme elaborated by a fungus selected from the group consisting of the species *Entomophthora apiculata Entomophthora coronata, Basidiobolus ranarum, Conidiobolus brefeldianus* and *Conidiobolus villosus*, which comprises the steps of aerobically growing a fungus of a species selected from the group consisting of the species *Entomophthora apiculata, Entomophthora coronata, Basidiobolus ranarum, Conidiobolus brefeldianus* and *Conidiobolus villosus*, in a nutrient medium containing a source of carbon, nitrogen and traces of inorganic acid salts at a pH from about 5.0 to about 9.0, for a period of about 48 to 96 hours, at a temperature from about 20° C. to about 30° C., separating the proteolytic enzyme therefrom by adsorbing the enzyme on an adsorbent material at a pH of from about 6.5 to about 8.5 and thereafter eluting the enzyme therefrom at a pH of from about 9.5 to about 11.5.

5. A process of producing a proteolytic enzyme elaborated by a fungus selected from the group consisting of the species *Entomophthora apiculata, Entomophthora coronata, Basidiobolus ranarum, Conidiobolus brefeldianus* and *Conidiobolus villosus*, which comprises the steps of preparing an aqueous nutrient medium, inoculating the medium with a fungus of a species selected from the group consisting of the species *Entomophthora apiculata, Entomophthora coronata, Basidiobolus ranarum, Conidiobolus brefeldianus* and *Conidiobolus villosus*, allowing aerobic fermentation to take place until a substantial amount of proteolytic enzyme is produced therein, and thereafter recovering the so produced enzyme from the fermentation medium.

6. A process of producing a proteolytic enzyme elaborated by a fungus selected from the group consisting of the species *Entomophthora apiculata, Entomophthora coronata, Basidiobolus ranarum, Conidiobolus brefeldianus* and *Conidiobolus villosus*, in an aqueous fermentation medium containing a fermentable source of carbon, nitrogen and essential mineral salts, which comprises inoculating the medium with a fungus of a species selected from the group consisting of the species *Entomophthora apiculata, Entomophthora coronata, Basidiobolus ranarum, Conidiobolus brefeldianus* and *Conidiobolus villosus*, allowing aerobic fermentation to take place until a substantial amount of proteolytic enzyme is produced therein, and thereafter recovering the so produced enzyme from the fermentation medium.

7. A process of producing a proteolytic enzyme elaborated by a fungus selected from the group consisting of the species *Entomophthora apiculata, Entomophthora coronata, Basidiobolus ranarum, Conidiobolus brefeldianus* and *Conidiobolus villosus*, in an aqueous fermentation medium containing a fermentable source of carbon, nitrogen and essential mineral salts, which comprises inoculating the medium with a fungus of a species selected from the group consisting of the species *Entomophthora apiculata, Entomophthora coronata, Basidiobolus ranarum, Conidiobolus brefeldianus* and *Conidiobolus villosus*, allowing aerobic fermentation to take place until a substantial amount of proteolytic enzyme is produced therein, and precipitating the proteolytic enzyme from the fermentation medium by the addition of tannic acid.

8. A process according to claim 7 in which the tannic acid-proteolytic enzyme complex is dissociated by slurrying the complex in an aqueous solution of a water-miscible solvent, and thereafter recovering the enzyme.

References Cited in the file of this patent

UNITED STATES PATENTS

| 1,882,112 | Boidin | Oct. 11, 1932 |
| 2,602,769 | Murray | July 8, 1952 |

OTHER REFERENCES

Abderhalden, E., et al.: Studien über die Specifizität der proteolytischen Fermente bei verschiedenen Pilzen, Z. physiol. Chem., 1909, #59, pp. 249–255.

Waksman et al.: Enzymes, 1926, Williams and Wilkins, page 118.

Oppenheimer et al.: Die Fermente und ihre Wirkungen, Fünfte Auflage, 1926 (A.P.C.), pp. 1127–1129.

Am. Jour. of Botany, vol. 16, pp. 87–119 (1929).

Berger et al.: Jour. Biol. Chem., 117, 1937, pp. 429–438.

Nord-Weidenhagen: Handbuch der Enzymologie, 1940 (A.P.C.), pp. 568–569.

Chemistry and Technology of Enzymes, 1949, by H. Tauber, publ. by John Wiley & Sons, Inc. (N.Y.), pp. 402 and 403.

Archives of Biochemistry, vol. 7, 1945, pp. 357 to 365.

Bessey: Morphology and Taxonomy of Fungi, Blakiston, Philadelphia, 1950, pp. 176–177.